(12) United States Patent
Hong et al.

(10) Patent No.: US 11,480,096 B1
(45) Date of Patent: Oct. 25, 2022

(54) SYSTEM AND METHOD FOR REMOVING CONDENSATE WATER OF AN INTERCOOLER FOR A HYBRID VEHICLE

(71) Applicants: HYUNDAI MOTOR COMPANY, Seoul (KR); KIA CORPORATION, Seoul (KR)

(72) Inventors: Yong Pyo Hong, Hwaseong-si (KR); Jung Sub Lee, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/524,576

(22) Filed: Nov. 11, 2021

(30) Foreign Application Priority Data

May 10, 2021 (KR) .................. 10-2021-0059702

(51) Int. Cl.
*F02B 29/04* (2006.01)
*F02M 26/35* (2016.01)
*F02M 35/10* (2006.01)

(52) U.S. Cl.
CPC ...... *F02B 29/0468* (2013.01); *F02B 29/0437* (2013.01); *F02B 29/0475* (2013.01); *F02M 26/35* (2016.02); *F02M 35/10222* (2013.01)

(58) Field of Classification Search
CPC ............. F02B 29/0468; F02B 29/0437; F02B 29/0475

USPC ........................................................ 123/563
See application file for complete search history.

(56) References Cited

U.S. PATENT DOCUMENTS

| 9,938,913 | B2 * | 4/2018 | Dudar | F02B 29/0406 |
|---|---|---|---|---|
| 10,000,136 | B2 * | 6/2018 | Jang | B60L 58/12 |
| 10,196,996 | B2 | 2/2019 | Dudar | |
| 10,563,571 | B2 * | 2/2020 | Kindl | F02B 33/40 |
| 2015/0176480 | A1 * | 6/2015 | Maceroni | F01N 3/04 60/599 |
| 2017/0145933 | A1 * | 5/2017 | Dudar | F02B 29/0406 |
| 2018/0202349 | A1 * | 7/2018 | Kindl | F02B 39/10 |
| 2019/0257231 | A1 * | 8/2019 | Dudar | F01N 13/10 |

FOREIGN PATENT DOCUMENTS

| DE | 102013111446 A1 * | 4/2014 | ......... F02B 29/0468 |
|---|---|---|---|
| DE | 102017111085 A1 * | 7/2017 | |
| DE | 102020105935 B4 * | 5/2022 | ......... F02B 29/0468 |

* cited by examiner

*Primary Examiner* — J. Todd Newton
(74) *Attorney, Agent, or Firm* — Lempia Summerfield Katz LLC

(57) ABSTRACT

A system and method for removing condensate water of an intercooler for a hybrid vehicle are configured to improve combustion efficiency of an engine by supercharging intake air to a combustion chamber of the engine using an electronic compressor instead of an existing turbocharger and configured to backward drive the electronic compressor to distribute and capture the condensate water generated in the intercooler, especially, when the engine is turned off.

10 Claims, 4 Drawing Sheets

SYSTEM AND METHOD FOR REMOVING CONDENSATE WATER OF AN INTERCOOLER FOR A HYBRID VEHICLE

CROSS-REFERENCE TO RELATED APPLICATION

This application claims under 35 U.S.C. § 119(a) the benefit of priority to Korean Patent Application No. 10-2021-0059702 filed on May 10, 2021, the entire contents of which are incorporated herein by reference.

BACKGROUND

(a) Technical Field

The present disclosure relates to a system and method for removing condensate water produced by an intercooler for a hybrid vehicle, and more particularly, to such a system and method which are configured to distribute and capture the condensate water generated in the intercooler using backward driving of an electronic compressor.

(b) Background Art

As is well-known, a hybrid vehicle that is a kind of eco-friendly vehicle refers to a vehicle in which a motor and an engine are both used as a driving source.

For the purpose of reducing exhaust gas and improving engine efficiency, a turbocharger made up of a turbine, a compressor, an exhaust gas recirculation (EGR) valve for recirculating the exhaust gas toward intake air, and so on are mounted on an intake line and an exhaust line of the engine mounted on the hybrid vehicle.

Therefore, when the engine is driven, the turbine is rotated by a pressure of the exhaust gas exhausted from the engine to the exhaust line and the compressor connected coaxially to the turbine is rotated. Accordingly, the intake air flowing into the intake line is supercharged to a combustion chamber of the engine, thereby improving combustion efficiency of the engine.

In addition, when the EGR valve is opened, a part of the exhaust gas exhausted to the exhaust line passes through the EGR valve due to a pressure difference between an upstream end of the turbine and a downstream end of the compressor. The exhaust gas passing through the EGR valve flows to the intake line, is mixed with fresh air, and is resupplied to the engine, thereby reducing emissions such as NOx included in the exhaust gas.

In this case, an intercooler is mounted between the compressor and an intake manifold of the engine. The intercooler functions to cool intake air (i.e., suctioned air in which fresh air and a recirculated exhaust gas are mixed), a temperature of which has been raised due to, for instance, adiabatic compression of the compressor, in order to increase supercharge efficiency of the intake air using a coolant or the like.

Further, an EGR cooler is mounted between an exhaust manifold of the engine and the EGR valve. The EGR cooler functions to cool high-temperature exhaust gas coming out of the exhaust manifold of the engine using a coolant or the like in order to prevent burning of, for instance, the EGR valve due to the high-temperature exhaust gas.

However, when fresh air is supercharged to the combustion chamber of the engine by driving the turbine and the compressor of the turbocharger and is cooled in the intercooler, a lot of condensate water is generated, and thus the following problems are caused.

First, there is a problem in that the condensate water generated in the intercooler after the engine is turned off flows into the combustion chamber in a moment when the engine is turned on, and thus causes engine misfire.

Second, there is a problem in that, due to freezing of the condensate water accumulated in the intercooler in the winter, a breakage phenomenon of the intercooler is caused, or pieces of ice flow into the combustion chamber, which causes engine misfire.

Third, deterioration of fuel efficiency resulting from a reduction in operating range of the turbocharger and the EGR may be caused under a low-temperature high-humidity condition under which the condensate water is excessively generated.

SUMMARY

The present disclosure is devised to solve the conventional general problems as described above and is directed to providing a system and method for removing condensate water produced by an intercooler for a hybrid vehicle. The system and method are configured to improve combustion efficiency of an engine by supercharging intake air to a combustion chamber of the engine using an electronic compressor instead of an existing turbocharger and to backward drive the electronic compressor (i.e., drive the compressor in a direction opposite to the direction used to compress air supplied to the engine) to distribute and capture the condensate water generated in the intercooler, especially when the engine is turned off.

To achieve the aforementioned objects, an embodiment of the present disclosure provides a system for removing condensate water produced by an intercooler for a hybrid vehicle. The system includes: an electronic compressor mounted on an intake line connected to an intake manifold of an engine; the intercooler mounted on the intake line between intake manifold of the engine and the electronic compressor; a condensate water capture chamber mounted on the intake line connected between an outlet portion of the electronic compressor and an inlet portion of the intercooler; a mixer mounted on the intake line connected to an inlet portion of the electronic compressor; a differential pressure valve mounted on one end of the intake line connected to an inlet portion of the mixer; an EGR valve mounted on an exhaust gas recirculation line connected between an exhaust manifold of the engine and the intake line between the differential pressure valve and the condensate water capture chamber; and a controller configured to backward drive the electronic compressor when the engine is turned off and switched to an EV driving mode using a motor. The condensate water generated in the intercooler is captured in the condensate water capture chamber and is distributed to the intake line and the exhaust gas recirculation line by the backward driving of the electronic compressor.

When a resonator is mounted on the intake line connected between the outlet portion of the electronic compressor and the inlet portion of the intercooler, the condensate water capture chamber may be formed at a lower portion of the resonator.

Condensate water inlets formed in an upper portion of the condensate water capture chamber may be slantingly formed in a direction opposite to a forward direction of intake air.

The controller may calculate an amount of the condensate water in the intercooler on the basis of an internal temperature and an external humidity of the intercooler when the engine is turned off and switched to the EV driving mode and driven by a motor. The controller may be configured to backward drive the electronic compressor under the control thereof when the calculated amount of the condensate water is more than zero and is smaller than an allowable amount of the condensate water.

The controller may be configured to close the differential pressure valve and open the EGR valve under the control thereof along with the backward driving control of the electronic compressor.

To achieve the aforementioned object, another embodiment of the present disclosure provides a method of removing condensate water produced by an intercooler for a hybrid vehicle. The method includes: a control step of backward driving an electronic compressor when an engine is turned off and switched to an EV driving mode and driven by a motor; and a step of causing the condensate water generated in the intercooler to be captured in a condensate water capture chamber mounted on an intake line connected to an outlet portion of the electronic compressor and to be distributed to the intake line and an exhaust gas recirculation line by the backward driving of the electronic compressor.

The method of the present disclosure may include calculating an amount of the condensate water in the intercooler on the basis of an internal temperature and an external humidity of the intercooler before the electronic compressor is backward driven. The method may also include backward driving the electronic compressor when the calculated amount of the condensate water is more than zero and is smaller than an allowable amount of the condensate water.

In the method of the present disclosure, a control step of closing a differential pressure valve mounted on one end of the intake line connected to the condensate water capture chamber and opening an EGR valve mounted on an exhaust gas recirculation line connected to the intake line between the differential pressure valve and the condensate water capture chamber along with the backward driving of the electronic compressor may be advanced.

Further, when a resonator is mounted on the intake line that connects an outlet portion of the electronic compressor and an inlet portion of the intercooler, the condensate water from the intercooler may be captured in a condensate water capture chamber formed at a lower portion of the resonator.

Further, the condensate water captured in the condensate water capture chamber may be evaporated and removed by high-temperature intake air supplied to a combustion chamber of the engine as the engine is restarted on.

The present disclosure provides the following effects through a means for solving the aforementioned problems.

First, a turbo lag phenomenon of the existing turbocharger can be eliminated because the electronic compressor that can be operated with a voltage of a high-voltage battery mounted in the hybrid vehicle is adopted instead of an existing turbocharger made up of a turbine and a compressor. Thus, intake air can be more easily supercharged to a combustion chamber of an engine and combustion efficiency of the engine can be improved.

Second, because the condensate water generated in the intercooler is enabled to be distributed and captured by backward driving the electronic compressor when the engine is turned off, an engine misfire phenomenon and a breakage phenomenon of the intercooler which are caused by the condensate water inside the intercooler in the related art can be prevented.

Third, because the condensate water inside the intercooler is distributed and captured although it is excessively generated, exhaust gas recirculation caused by the condensate water is not limited. Thus, an effect of raising fuel efficiency can be maximized by increasing a flow rate of the recirculated exhaust gas.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein.

DETAILED DESCRIPTION

Hereinafter, embodiments of the present disclosure are described in detail with reference to the attached drawings. When a component, device, element, or the like of the present disclosure is described as having a purpose or performing an operation, function, or the like, the component, device, or element should be considered herein as being "configured to" meet that purpose or to perform that operation or function.

Figure 1:
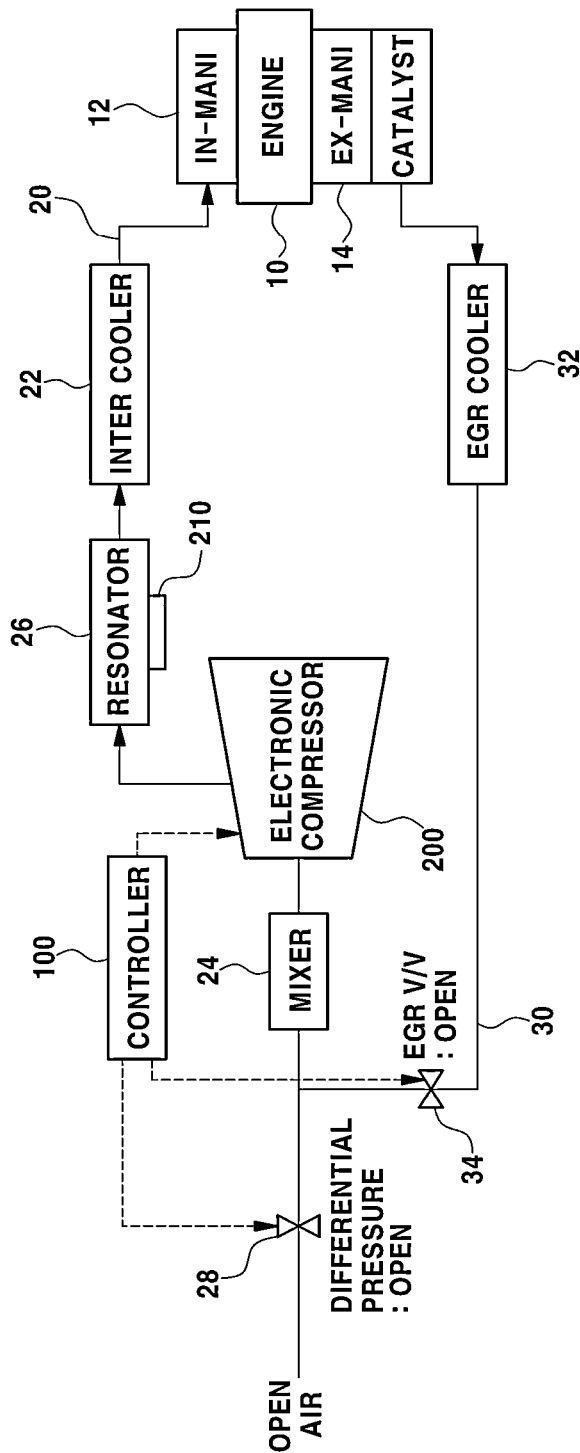
FIG. 1 is a diagram illustrating a state in which, in a system for removing condensate water of an intercooler for a hybrid vehicle according to the present disclosure, intake air is supercharged by driving of an electronic compressor.
Figure 2:
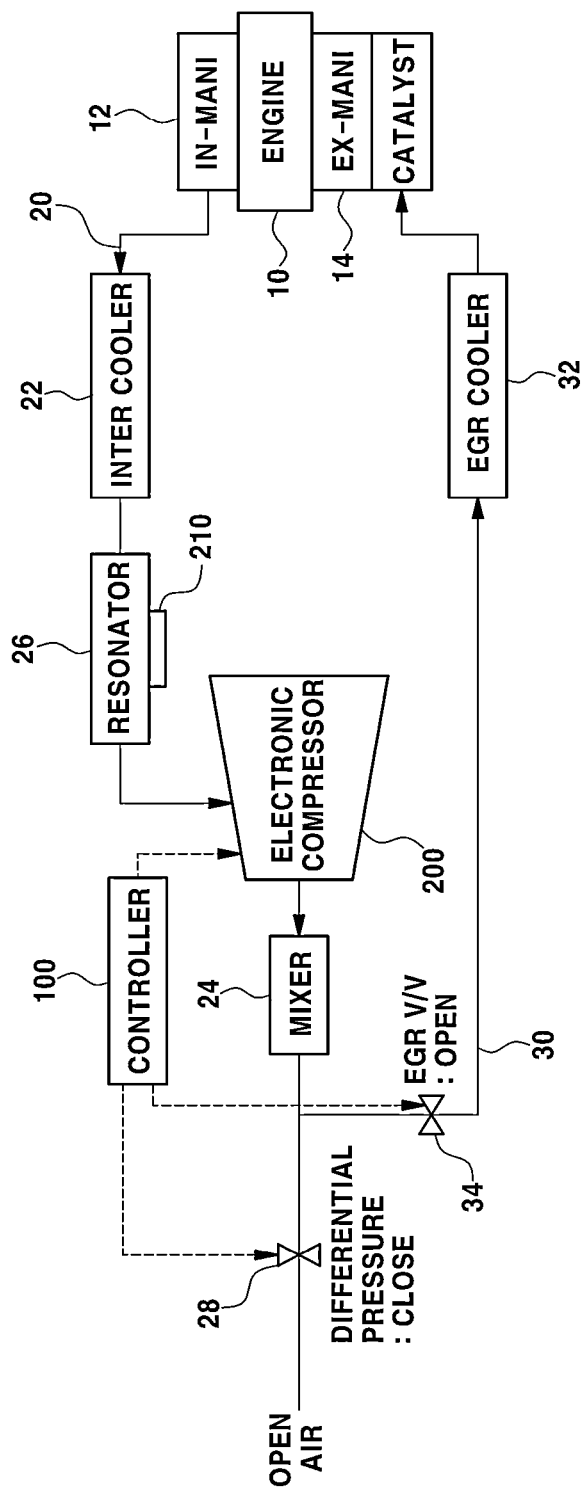
FIG. 2 is a diagram illustrating a state in which, in the system for removing condensate water of an intercooler for a hybrid vehicle according to the present disclosure, the condensate water inside the intercooler is distributed by backward driving of the electronic compressor.

FIGS. 1 and 2 are diagrams illustrating a system for removing condensate water of an intercooler for a hybrid vehicle according to the present disclosure.

As illustrated in FIGS. 1 and 2, an intake line 20 is connected to an intake manifold 12 of an engine 10 mounted on a hybrid vehicle. An exhaust gas recirculation line 30 branching from an exhaust line is connected to an exhaust manifold 14 of the engine.

An electronic compressor 200 for supercharging intake air to a combustion chamber through the intake manifold 12 of the engine 10 is mounted on the intake line 20.

Further, an intercooler 22 is mounted on the intake line 20 between the intake manifold 12 of the engine 10 and the electronic compressor 200.

Further, a mixer 24 for mixing fresh air constituting intake air and a recirculated exhaust gas is connected to the intake line 20 connected to an inlet portion of the electronic compressor 200.

Further, a differential pressure valve 28 for allowing or blocking introduction of ambient air is mounted on an end of the intake line 20 connected to an inlet portion of the mixer 24.

In particular, a resonator 26 that reduces a noise of air forcibly suctioned by driving of the electronic compressor 200 may be connected to the intake line 20 between an outlet of the electronic compressor 200 and an inlet of the intercooler 22.

In addition, an exhaust gas recirculation (EGR) cooler 32 and an EGR valve 34 are mounted in order (i.e., the EGR valve 34 is mounted downstream of the EGR cooler 32) on the exhaust gas recirculation line 30 connected between the exhaust manifold 14 of the engine 10 and the intake line 20 between the differential pressure valve 28 and the mixer 24.

For reference, the EGR cooler 32 functions to cool a high-temperature exhaust gas flowing to the EGR valve 34 and the EGR valve 34 functions to adjust an amount of a recirculated exhaust gas according to an amount of opening thereof.

Meanwhile, the electronic compressor 200 is adopted to supercharge intake air to the combustion chamber of the engine instead of an existing turbocharger made up of a turbine and a compressor.

The reason why the electronic compressor 200 is adopted instead of the existing turbocharger made up of a turbine and a compressor is that the intake air can be more easily supercharged to the combustion chamber of the engine than by the existing turbocharger made up of a turbine and a compressor. This is because the electronic compressor 200 can be operated with a high voltage (e.g., 48 V or higher) of a high-voltage battery mounted in the hybrid vehicle and thus a desired engine output can be rapidly obtained.

Additionally, another reason why the electronic compressor 200 is adopted instead of the existing turbocharger made up of a turbine and a compressor is that, when the engine is turned off and is switched to an EV driving mode and driven by a motor, the condensate water generated from the intercooler can be distributed to the intake line and the exhaust gas recirculation line by backward driving the electronic compressor, and can be captured and easily removed to a separate condensate water capture chamber.

Figure 3:
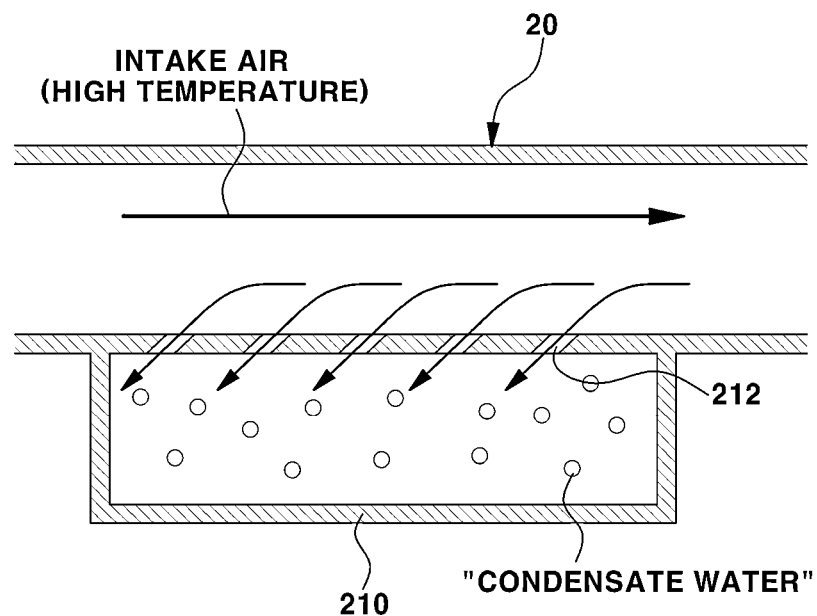
FIG. 3 is a partially enlarged sectional diagram illustrating a condensate water capture chamber among components of the system for removing condensate water of an intercooler for a hybrid vehicle according to the present disclosure.
Figure 4:
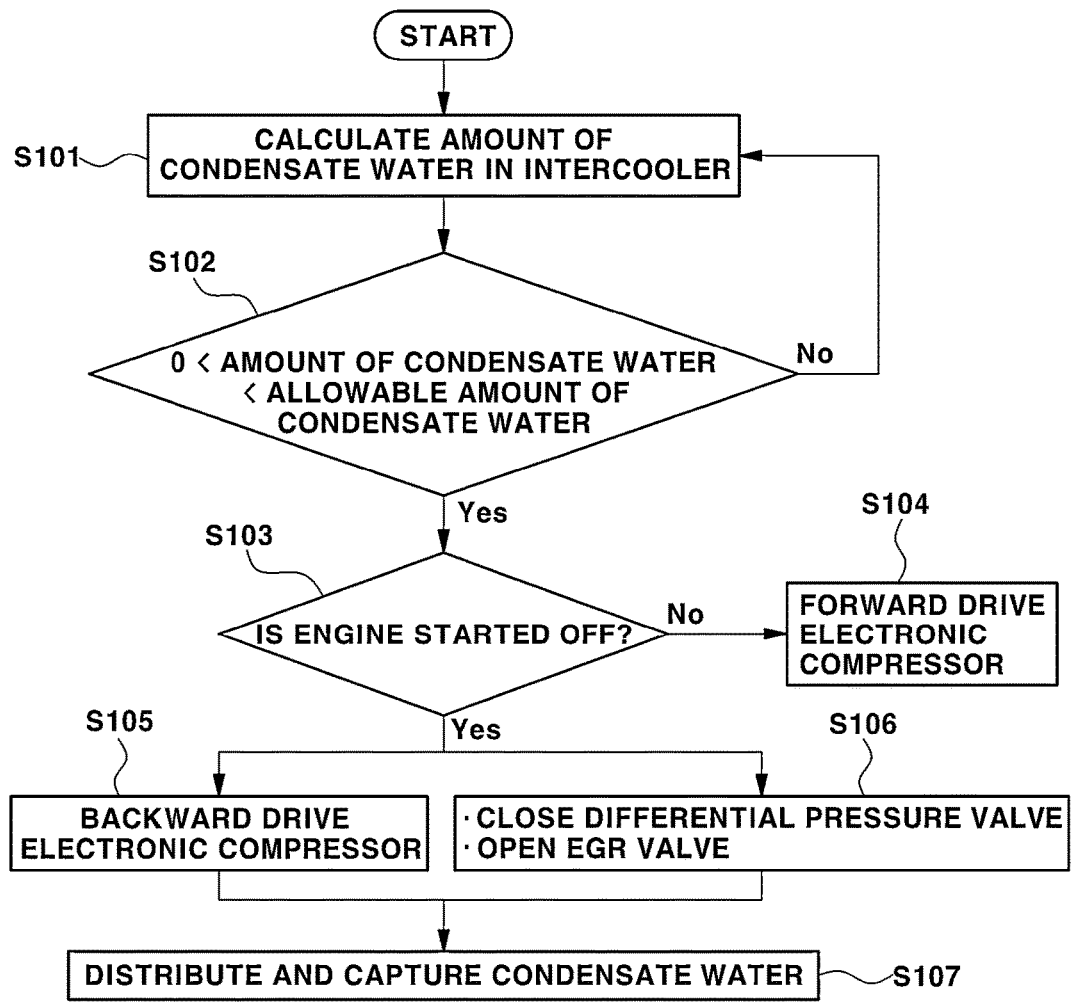
FIG. 4 is a flow chart illustrating a method of removing condensate water of an intercooler for a hybrid vehicle according to the present disclosure.

To this end, a condensate water capture chamber 210, which is configured to capture condensate water falling down due to gravity is mounted on the intake line 20, as illustrated in FIG. 3, and connected between the outlet portion of the electronic compressor 200 and the inlet portion of the intercooler 22.

The condensate water capture chamber 210 may be directly mounted on the intake line 20 between the outlet portion of the electronic compressor 200 and the inlet portion of the intercooler 22. Additionally, the condensate water capture chamber 210 may be formed under the resonator 26 using welding or the like when the resonator 26 is mounted between the outlet of the electronic compressor 200 and the inlet of the intercooler 22.

The condensate water capture chamber 210 may be directly formed on the intake line 20 or under the resonator 26. Also, as illustrated in FIG. 3, a plurality of condensate water inlets 212 formed in an upper portion of the condensate water capture chamber 210 may be slantingly formed in a direction opposite to a forward direction (i.e., a direction in which intake air flows to the engine) of the intake air.

In this way, because the condensate water inlets 212 of the condensate water capture chamber 210 are slantingly formed in the direction opposite to the forward direction of the intake air, resistance of the intake air flowing to the engine can be removed, whereas, as described below, the condensate water inside the intercooler can be easily introduced into the condensate water capture chamber 210 by backward driving of the electronic compressor 200.

Meanwhile, the condensate water removing system of the present disclosure includes a controller 100 that backward drives the electronic compressor 200 when the engine is turned off and is switched to the EV driving mode using a motor.

Thus, when the electronic compressor 200 is backward driven by a drive control signal of the controller 100, while the condensate water accumulated in the intercooler 22 is suctioned toward the electronic compressor 200, a part thereof can be distributed toward the intake line 20 and the exhaust gas recirculation line 30, and most thereof can be captured in the condensate water capture chamber 210.

To this end, when the engine is turned off and is switched to the EV driving mode and driven by the motor, the controller 100 calculates an amount of the condensate water in the intercooler 22 on the basis of an internal temperature and an external humidity of the intercooler 22. Also, the controller 100 is configured to backward drive the electronic compressor 200 under the control thereof when the calculated amount of the condensate water is more than zero and is smaller than a preset allowable amount of the condensate water.

Further, the controller 100 is configured to close the differential pressure valve 28 under the control thereof to prevent condensate water from flowing toward the end of the intake line 20 into which fresh air flows along with the backward driving control of the electronic compressor 200. The controller 100 is also configured to open the EGR valve 34 under the control thereof such that the condensate water is distributed to the exhaust gas recirculation line 30.

Here, a method of removing condensate water of an intercooler of the present disclosure based on the above-mentioned configuration is described as follows.

First, an amount of condensate water in the intercooler 22 is calculated (S101).

For example, an amount of condensate water in the intercooler may be calculated from an amount of condensate water generated according to an internal temperature and an external humidity of the intercooler. The amount of condensate water in the intercooler may be calculated using a condensate water generation model that is established by the controller 100 in advance using a computer on the basis of the internal temperature and the external humidity of the intercooler.

Further, after an actual physical model from which the condensate water in the intercooler is generated is established, the condensate water generated in the physical model is measured while adjusting the internal temperature and the external humidity of the intercooler. Further, after the amount of condensate water generated according to the internal temperature and the external humidity of the intercooler is converted into a data, the data may be stored in a memory of the controller and be used to calculate the amount of condensate water.

Further, a water level sensor or a humidity sensor is directly mounted in the intercooler such that a signal for detecting the amount of condensate water is transmitted to the controller. Thus, a method of recognizing the amount of condensate water from a signal of the sensor by the controller can be used.

Next, it is determined whether the amount of condensate water in the intercooler calculated in step S101 above is more than zero (0) and is smaller than an allowable amount of condensate water (S102).

Thus, when the amount of condensate water in the intercooler is more than zero (0) and is smaller than an allowable amount of condensate water, the controller determines that it is necessary to remove the condensate water.

Next, it is determined whether the engine is started on (S103).

As a result of the determination, when the engine is started on, the electronic compressor 200 is driven in a forward direction on the basis of a drive control signal of the controller 100 (S104).

In other words, in the case of a hybrid electric vehicle (HEV) driving mode in which the engine and the motor are driven together in a state in which the engine is started, i.e., turned on, and the hybrid vehicle travels, the electronic compressor 200 is rotated and driven in a forward direction. Thereby, intake air can be easily supercharged to the combustion chamber of the engine.

More specifically, because the electronic compressor 200 can be operated with a high voltage (e.g., 48 V or higher) of a high-voltage battery mounted in the hybrid vehicle when the engine is driven instead of the existing turbocharger made up of a turbine and a compressor, a turbo lag phenomenon of the existing turbocharger can be eliminated. Thus, the intake air can be easily supercharged to the combustion chamber of the engine and a desired engine output can be rapidly obtained.

In this case, because the amount of condensate water in the intercooler is more than zero (0), it is necessary to remove the condensate water. Also, because the amount of condensate water in the intercooler is smaller than an allowable amount of condensate water, no condensate water flows into the combustion chamber of the engine although the electronic compressor 200 is driven in a forward direction.

As a result of the determination in step S103 above, if the engine is turned off, the electronic compressor 200 is driven in a backward direction on the basis of a drive control signal of the controller 100 (S105).

In other words, when the engine is turned off and switched to an EV driving mode and driven by the motor, the electronic compressor 200 is rotated and driven in a backward direction on the basis of the drive control signal of the controller 100.

Further, along with the backward driving of the electronic compressor 200, the differential pressure valve 28 is closed by a control signal of the controller 100 and the EGR valve 34 is opened (S106).

In other words, the differential pressure valve 28 mounted on the end of the intake line 20 connected to a front end of the condensate water capture chamber 210 is closed and the EGR valve 34 mounted on the exhaust gas recirculation line 30 connected to the intake line 20 between the differential pressure valve 28 and the condensate water capture chamber 210 is opened.

Thus, most of the condensate water generated in the intercooler 22 is captured in the condensate water capture chamber 210 of the resonator 26 by a suction force based on the backward driving of the electronic compressor 200. A part of the condensate water is distributed to the intake line 20 and the exhaust gas recirculation line 30 (S107).

In this case, as the differential pressure valve 28 is closed, the condensate water does not flow toward the end of the intake line 20 into which fresh air flows. Also, as the EGR valve 34 is opened, the condensate water can be easily distributed to the exhaust gas recirculation line 30.

Further, because the plurality of condensate water inlets 212 are slantingly formed in the upper portion of the condensate water capture chamber 210 that is directly formed in the intake line 20 or is formed under the resonator 26 in a direction opposite to a forward direction (a direction in which intake air flows to the engine) of the intake air as illustrated in FIG. 3, resistance of intake air flowing to the engine can be removed. Further, the condensate water distributed in a direction opposite to the intake line 20 from the intercooler 22 by the backward driving of the electronic compressor 200 can easily flow into the condensate water capture chamber 210.

Meanwhile, as the engine is restarted, i.e., turned on, the condensate water captured in the condensate water capture chamber 210 can be evaporated and removed by high-temperature intake air (a mixture of fresh air and a recirculated exhaust gas) supplied to the combustion chamber of the engine as illustrated in FIG. 3.

In this way, the condensate water generated in the intercooler 22 by backward driving the electronic compressor 200 when the engine is turned off is enabled to be distributed and captured. An engine misfire phenomenon and a breakage phenomenon of the intercooler, which are caused by the condensate water in the intercooler in the related art, are thereby easily prevented.

As described above, the inventive concept of the present disclosure has been described in detail in several embodiments. However, the scope of the present disclosure is not limited to the aforementioned embodiments. Various modifications and improvements carried out by those having ordinary skill in the art using the concepts of the present disclosure defined by the following claims are also included in the scope of the present disclosure.

What is claimed is:

1. A system for removing condensate water produced by an intercooler for a hybrid vehicle, the system comprising:
   an electronic compressor mounted on an intake line connected to an intake manifold of an engine;
   the intercooler mounted on the intake line between the intake manifold of the engine and the electronic compressor;
   a condensate water capture chamber mounted on the intake line connected
   between an outlet portion of the electronic compressor and an inlet portion of the intercooler;
   a mixer mounted on the intake line connected to an inlet portion of the electronic compressor;
   a differential pressure valve mounted on one end of the intake line connected
   to an inlet portion of the mixer;
   an exhaust gas recirculation (EGR) valve mounted on an exhaust gas recirculation line connected between an exhaust manifold of the engine and the intake line between the differential pressure valve and the condensate water capture chamber; and
   a controller configured to backward drive the electronic compressor when the
   engine is turned off and switched to an electric vehicle (EV) driving mode and driven by a motor, wherein the condensate water generated in the intercooler is captured in the condensate water capture chamber and is distributed to the intake line and the exhaust gas recirculation line by the backward driving of the electronic compressor.

2. The system of claim 1, wherein, when a resonator is mounted on the intake line connected between the outlet portion of the electronic compressor and the inlet portion of the intercooler, the condensate water capture chamber is formed at a lower portion of the resonator.

3. The system of claim 1, wherein condensate water inlets formed in an upper portion of the condensate water capture chamber are slantingly formed in a direction opposite to a forward direction of intake air.

4. The system of claim 1, wherein the controller calculates an amount of the condensate water in the intercooler on the basis of an internal temperature and an external humidity of the intercooler when the engine is turned off and switched to the EV driving mode and driven by the motor, and is configured to backward drive the electronic compressor under the control thereof when the calculated amount of the condensate water is more than zero and is smaller than an allowable amount of the condensate water.

5. The system of claim 1, wherein the controller closes the differential pressure valve and opens the EGR valve under the control thereof along with the backward driving control of the electronic compressor.

6. A method of removing condensate water produced by an intercooler for a hybrid vehicle, the method comprising:
backward driving an electronic compressor when an engine is turned off and switched to an electric vehicle (EV) driving mode using a motor; and
capturing, by the backward driving of the electronic compressor, the
condensate water generated in the intercooler in a condensate water capture chamber mounted on an intake line connected to an outlet portion of the electronic compressor and then distributing the captured condensate water to the intake line and an exhaust gas recirculation line.

7. The method of claim 6, further comprising calculating an amount of the condensate water in the intercooler on the basis of an internal temperature and an external humidity of the intercooler before the electronic compressor is backward driven, and backward driving the electronic compressor when the calculated amount of the condensate water is more than zero and is smaller than an allowable amount of the condensate water.

8. The method of claim 6, wherein the backward driving of the electronic compressor is controlled to coincide with closing a differential pressure valve mounted on one end of the intake line where a mixer is connected thereto and opening an exhaust gas recirculation (EGR) valve mounted on an exhaust gas recirculation line connected to the intake line between the differential pressure valve and the mixer.

9. The method of claim 6, wherein, when a resonator is mounted on the intake line that connects an outlet portion of the electronic compressor and an inlet portion of the intercooler, the condensate water from the intercooler is captured in a condensate water capture chamber formed at a lower portion of the resonator.

10. The method of claim 9, wherein the condensate water captured in the condensate water capture chamber is evaporated and removed by high-temperature intake air supplied to a combustion chamber of the engine as the engine is turned on.

\* \* \* \* \*